US012404776B2

(12) United States Patent
Gold et al.

(10) Patent No.: US 12,404,776 B2
(45) Date of Patent: Sep. 2, 2025

(54) AIRFOIL WITH PROTECTIVE COATING

(71) Applicants: Rolls-Royce North American Technologies, Inc., Indianapolis, IN (US); Rolls-Royce Corporation, Indianapolis, IN (US)

(72) Inventors: Matthew R. Gold, Indianapolis, IN (US); Andrew Glucklich, Indianapolis, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/633,432

(22) Filed: Apr. 11, 2024

(65) Prior Publication Data

US 2024/0344462 A1 Oct. 17, 2024

Related U.S. Application Data

(60) Provisional application No. 63/496,170, filed on Apr. 14, 2023.

(51) Int. Cl.
*F01D 5/28* (2006.01)
*C23C 24/00* (2006.01)

(52) U.S. Cl.
CPC .............. *F01D 5/288* (2013.01); *C23C 24/00* (2013.01); *F05D 2220/32* (2013.01)

(58) Field of Classification Search
CPC ...... F01D 5/288; C23C 24/00; F05D 2220/32
See application file for complete search history.

(56) References Cited

U.S. PATENT DOCUMENTS 4,741,975 A 5/1988 Naik et al.
4,855,188 A 8/1989 Garg et al.
6,341,747 B1 * 1/2002 Schmidt ................ B64C 11/205 416/224
8,036,341 B2 * 10/2011 Lee ........................ H01J 35/112 378/143
8,118,561 B2 2/2012 Bruce et al.
8,851,421 B2 * 10/2014 Jevons .................. F04D 29/324 244/123.1
(Continued)

FOREIGN PATENT DOCUMENTS

EP 0188057 A1 7/1986
EP 2677063 A1 * 12/2013 ............. C23C 30/00
(Continued)

OTHER PUBLICATIONS

Cobalt Powder Density 2016 (Year: 2016).*
(Continued)

*Primary Examiner* — Brian Christopher Delrue
(74) *Attorney, Agent, or Firm* — Shumaker & Sieffert, P.A.

(57) ABSTRACT

In some examples, a method of forming an article for a gas turbine engine, the method comprising depositing a powder to form a protective coating on a leading edge of an airfoil substrate. The deposited powder includes carbide particles in a metal matrix and the carbide particles in the powder have an average particle size of about 1 micron or less. The protective coating on the leading edge of the airfoil substrate includes the carbide particles in the metal matrix.

20 Claims, 8 Drawing Sheets

(56) References Cited

U.S. PATENT DOCUMENTS

| | | | | |
|---|---|---|---|---|
| 10,041,360 | B2 | 8/2018 | Klam et al. | |
| 2006/0018760 | A1* | 1/2006 | Bruce | C23C 28/321 416/229 A |
| 2007/0154738 | A1* | 7/2007 | Ganguly | C23C 30/00 427/446 |
| 2007/0202350 | A1* | 8/2007 | Humphreys | C23C 4/06 428/681 |
| 2007/0227299 | A1* | 10/2007 | Marchiando | B22F 7/08 75/244 |
| 2008/0166561 | A1 | 7/2008 | Rice et al. | |
| 2010/0040202 | A1* | 2/2010 | Lee | H01J 35/112 378/143 |
| 2010/0226783 | A1 | 9/2010 | Lipkin et al. | |
| 2010/0304107 | A1* | 12/2010 | Nardi | C23C 24/04 427/419.7 |
| 2011/0052406 | A1* | 3/2011 | Bruce | F04D 29/023 427/248.1 |
| 2014/0272166 | A1* | 9/2014 | Shim | F01D 5/288 427/256 |
| 2015/0275679 | A1* | 10/2015 | Strock | F01D 11/122 427/256 |
| 2020/0131654 | A1* | 4/2020 | Detor | C25D 1/00 |
| 2020/0370440 | A1* | 11/2020 | Zhuk | F04D 29/026 |
| 2022/0145426 | A1* | 5/2022 | He | C23C 28/3215 |

FOREIGN PATENT DOCUMENTS

| | | | | |
|---|---|---|---|---|
| WO | 2010044936 | A1 | 4/2010 | |
| WO | WO-2014074370 | A2 * | 5/2014 | F01D 11/122 |

OTHER PUBLICATIONS

Titanium Carbide Density 2015 (Year: 2015).*

"What Types of Carbide Powder are used with HVOF Spraying?", TWI, 5 pp., Retrieved Dec. 2022 from https://www.twi-global.com/technical-knowledge/faqs/faq-what-types-of-carbide-powder-are-used-with-hvof-spraying.

* cited by examiner

AIRFOIL WITH PROTECTIVE COATING

This application claims the benefit of U.S. Provisional Patent Application No. 63/496,170, filed Apr. 14, 2023, the entire content of which is incorporated herein by reference.

TECHNICAL FIELD

The present disclosure relates to airfoils for gas turbine engines.

BACKGROUND

The components of gas turbine engines operate in severe environments. Gas turbine engines may include, among others, a compressor section, a combustor, and a turbines section. Debris entering the engine can present issues for the compressor and other components. For example, when high-velocity particles, such as dust, sand, or ice, impact the compressor blades, the impacts can cause erosion (e.g., by the gradual removal of material from the blade surface). This may lead to loss of blade thickness, reduction in blade aerodynamic efficiency, and changes in blade profile, all of which may result in decreased compressor performance and reduced overall engine efficiency.

SUMMARY

In some examples, the disclosure describes a method of forming an article for a gas turbine engine, the method comprising depositing a powder to form a protective coating on a leading edge of an airfoil substrate, wherein the powder includes carbide particles in a metal matrix, wherein the carbide particles have an average particle size of about 1 microns or less, and wherein the protective coating includes the carbide particles in the metal matrix.

In some examples, the disclosure describes an article comprising an airfoil body; and a protective coating on a leading edge of the airfoil body, wherein the protective coating includes carbide particles in a metal matrix, wherein the carbide particles in the metal matrix has an average particle size of about 1 microns or less.

The details of one or more examples are set forth in the accompanying drawings and the description below. Other features, objects, and advantages will be apparent from the description and drawings, and from the claims.

DETAILED DESCRIPTION

Figure 1:
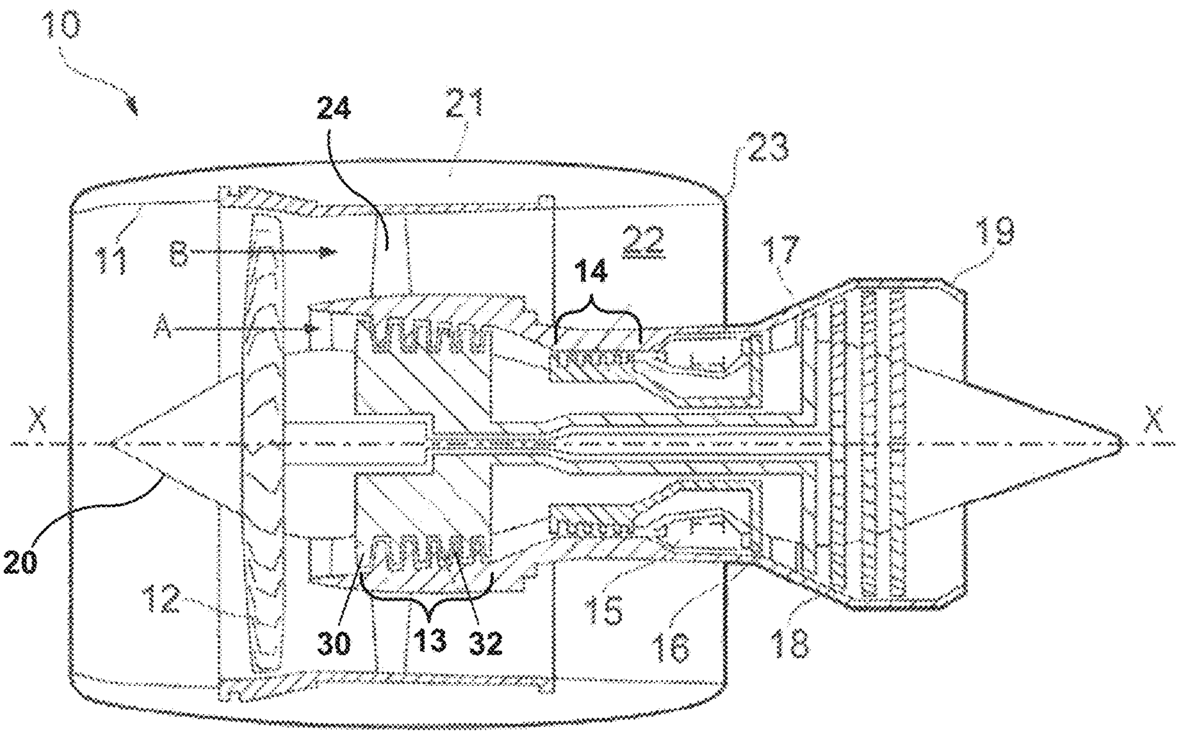
FIG. 1 is a schematic diagram illustrating a longitudinal cross-section view of an example high-bypass gas turbine engine.

The disclosure describes systems include an airfoil having a coating on a leading edge of the airfoil, and techniques for making and using the same. The airfoil may be a component in a gas turbine engine. During operation of the gas turbine engine, the leading edge of the airfoil may be subject to particle impact, including when the airfoil is a component that rotates during operation of the engine. Example coatings described herein may provide improved erosion resistance and/or other protection to the leading edge of the airfoil. For ease of description, airfoils of the present disclosure will be described in the context of compressor blades of a gas turbine engine. During operation, the compressor blades may be rotating which may cause the impact with particles to be relatively higher velocity as compared to other non-rotating blades or vanes also subject to particle impacts. However, providing erosion resistant coatings described herein on other example airfoils that are employed in gas turbine engines are also contemplated, particularly rotating components during operation, and may include compressor vanes, fan blades and vanes (e.g., as employed in turbofan engines), and propellers (e.g., as employed in turboprop engines). Example vanes include outlet guide vanes, inlet guide vanes, and integrated strut-vane nozzles.

During operation of a gas turbine engine, such as a turboshaft engine, the leading of gas turbine engines airfoil such as rotating compressor blades may be susceptible to erosion due to, e.g., particle impact during operation. For example, compressor blades that operate in austere environments on airframes may be subject relatively high velocity impacts of large amounts of abrasive particulates ingested during takeoff and landing. The relative velocity of the impacts may be increased due to the rotation of the compressor blades. This scenario may be particularly apparent when landing in a desert environment. Without a protective coating on the leading edge of the compressor blades, the erosion may cause such airfoils to be replaced at a relatively high frequency and cost.

In some examples, the leading edge of compressor airfoils may include relatively hard coatings to resist erosion. An example of such a hard coating is an TiAlN coating applied via a sputtering technique. However, these hard coatings may crack and locally chip when a particle with a great enough kinetic energy impacts the coating surface. Once these hard coatings chip, the underlying airfoil substrate may be revealed, which then preferentially erodes in a local area. Such irregularly eroded leading edge may cause undesirable reductions in airfoil efficiency, and thus can cause shorter times in service.

In accordance with examples of the disclose, an airfoil may include a protective coating on the lead edge in the form of carbide phased in a relatively ductile metal matrix. Such a protective coating may be tougher and may result in an erosion characteristic that is more graceful, e.g., as compared to a TiAlN coating. For example, an example protective coating of the disclosure may erode more gracefully in a sense that the protective coating that erodes gradually rather than abrupt chipping. The graceful erosion of such protective coatings may result from the relatively ductile metal matrix that is less susceptible to cracking but that instead may be remove slowly through a process of microscopic chipping (e.g., chips that are much less than the thickness of the coating (e.g., which may be about 50 microns to about 75 microns or about 2 mils to about 3 mils)).

While industries may have designed hard cermet coatings for use in surface to surface wear applications (e.g., in the case of rotating or sliding seals, valves, or landing gears), those coatings may not be particularly suitable for erosion protection coatings on the leading edge of an airfoil in a gas turbine engine. For example, because of the different mechanism for surface to surface wear application, such coatings applied to the leading edge of a combustor airfoil may not be ductile enough to exhibit gradual microchipping when eroded by particulate in a gas turbine engine operating environment.

Examples of the present disclosure may include protective coatings with amounts of hard carbide phase and ductile metal matrix phase that provides for the beneficial erosion characteristics described herein. For example, to provide for suitable erosion protection of leading edge of airfoils in gas turbine compressors, an erosion protection coating may be applied that balances the erosion performance between hardness of the coating and the ability to erode without chipping, thus erode "gracefully". The coating performance may be based on a tailored chemistry of the coating being applied, in which the carbide content and the ductile matrix of the coating are balanced to provide for a coating that will erode, but at a slower rate than the underlying airfoil substrate. For example, increasing the quantity of the softer matrix phase (e.g., cobalt, cobalt chrome, nickel chrome, CoNiCrAlY, or the like) with the intent of improving the toughness (reduced cracking and chipping) and erosion resistance. In some instances, with a tungsten carbide (WC)/Co coating on a leading edge of a combustor airfoil, the coating may have 17% or greater cobalt content as the ductile metal matrix phase (e.g., with about 17% to about 25% cobalt), which may allow for the "graceful" erosion of the protective coating during the operation of the gas turbine engine (e.g., by eroding by microchipping rather than cracking and chipping to expose the airfoil substrate surface).

Additionally, examples protective coatings of the present disclose may be formed with carbide particles having relatively small average particle size (e.g., having an average particle size of approximately 1 micron or less, such as sub-micron particles or nano-sized particles (e.g., from about 1 nanometer to about 100 nanometers). For example, to form such a coating, a powder having such carbide particles may be deposited on the leading edge of an airfoil substrate. The deposited carbide powder may include agglomerates (e.g., sintered agglomerates) with the relatively small carbide particles in the metal matrix. Although not being bound by theory, the resulting protective coating may be more ductile because of a relatively high amount of particle boundaries resulting from the use of such relatively small carbide particles, e.g., as compared to the use carbide particles having an average size of greater than 1 micron. The ductility may provide for better energy absorption by the coating upon high velocity impacts with foreign particles, e.g., due to the deformation of the coating. In general, the use of sub microns particles help with the wear and increased loading in the coating. For example, the overall toughness of the coating is improved by using sub-microns particles, which improves the wear characteristics.

FIG. 1 is a schematic diagram illustrating a longitudinal cross-section view of an example high-bypass gas turbine engine 10. Engine 10 is only one example of a gas turbine engine that may employ the examples coatings described herein. Other example gas turbine engines include turboshaft and turboprop configurations. Such examples may include compressor blades in the compressor sections on the engines that are more susceptible to erosion from high velocity particle impacts due to the nature of the airframes that are mounted to in operation.

In a turboshaft engine, the compressor blades may be located in the compressor section of the engine, which may be one of the main components of a gas turbine engine. The compressor section may be responsible for compressing incoming air before it enters the combustion chamber, where it is mixed with fuel and ignited to produce high-pressure gases that drive the turbine and ultimately power the engine. The compressor blades in a turboshaft engine may be arranged in multiple stages, with each stage consisting of a row of rotating blades, known as the rotor, and a row of stationary blades, known as the stator. The rotor blades are attached to the engine's main shaft and are driven by the engine's power turbine, which is connected to, e.g., a helicopter or other aircraft rotor system. As the rotor spins, it draws in and compresses air, which is then passed to the combustion chamber. The compressor blades in a turboshaft engine may be aerodynamically designed to efficiently compress the incoming air, increasing its pressure and temperature as it moves through the compressor stages. The compressed air is then mixed with fuel and ignited in the combustion chamber to produce hot gases that expand and drive the turbine, which in turn powers the rotor system and provides mechanical power for the helicopter. Such compressor blades may include one or more or the example protective coatings described herein.

In a turboprop engine, the compressor blades may be located in the compressor section of the engine, which is responsible for compressing incoming air before it enters the combustion chamber. However, there may be some differences in the design and application of compressor blades in a turboprop engine compared to a turboshaft engine. In a turboprop engine, the compressor blades may be used to compress air that is used for combustion, as well as to provide mechanical power to drive a propeller for thrust generation. The compressed air may be mixed with fuel and ignited in the combustion chamber to produce high-pressure gases that expand and drive the turbine. The turbine may be connected to the engine's output shaft, which drives the propeller through a reduction gearbox, allowing the engine to produce both jet thrust and mechanical power for propeller-driven thrust. The compressor blades in a turboprop engine may be arranged in multiple stages, with each stage consisting of a row of rotating blades, known as the rotor, and a row of stationary blades, known as the stator. The rotor blades may be driven by the engine's turbine and may be designed to efficiently compress the incoming air, increasing its pressure and temperature as it moves through the compressor stages. The compressed air is then mixed with fuel and ignited in the combustion chamber, and the resulting high-pressure gases drive the turbine, which powers the propeller through the output shaft. Such compressor blades may include one or more or the example protective coatings described herein.

In the example of FIG. 1, the central axis (e.g., principal and rotational axis) of rotating elements of gas turbine engine 10 is the X-X axis. Gas turbine engine 10 includes an air intake 11, a fan 12, and a core flow system A. The fan 12 includes rotor blades which are attached to a rotor disc. Nosecone 20 may be mounted to fan 12. The core flow system A includes an intermediate-pressure compressor 13, a high-pressure compressor 14, a combustion chamber 15, a high-pressure turbine 16, an intermediate-pressure turbine 17, a low-pressure turbine 18, and a nozzle 19. Furthermore, outside the core flow system A, the gas turbine engine includes bypass flow system B. The bypass flow system B includes a nacelle 21, a fan bypass 22, and a fan nozzle 23. In other examples, high-bypass gas turbine engine 10 may include few components or additional components.

Thrust, which propels an aircraft, is generated in a high-bypass gas turbine engine 10 by both the fan 12 and the core flow system A. Air enters the air intake 11 and flows substantially parallel to central axis X-X past the rotating fan 12, which increases the air velocity to provide a portion of the thrust. Outlet guide vanes 24 may be positioned aft of fan 12 to interact with air flowing through bypass flow system B. In some examples, outlet guide vanes 24 may be positioned closer to fan 12. A first portion of the air that passes between the rotor blades of the fan 12 enters the core flow system A, while a second portion enters the bypass flow system B. Air that enters the core flow system A is first compressed by intermediate-pressure compressor 13, then high-pressure compressor 14. The air in core flow system A enters combustion chamber 15, where it is mixed with fuel and ignited. The air that leaves the combustion chamber 15 has an elevated temperature and pressure compared to the air that first entered the core flow system A. The air with elevated temperature and pressure produces work to rotate, in succession, high-pressure turbine 16, intermediate-pressure turbine 17, and low-pressure turbine 18, before ultimately leaving the core flow system A through nozzle 19. The rotation of turbines 16, 17, and 18 rotates high-pressure compressor 14, intermediate pressure compressor 13, and fan 12, respectively. Air that passes through bypass flow system B does not undergo combustion or further compression and does not produce work to rotate turbines 16, 17, and 18, but contributes propulsive thrust to gas turbine engine 10.

Figure 2A:
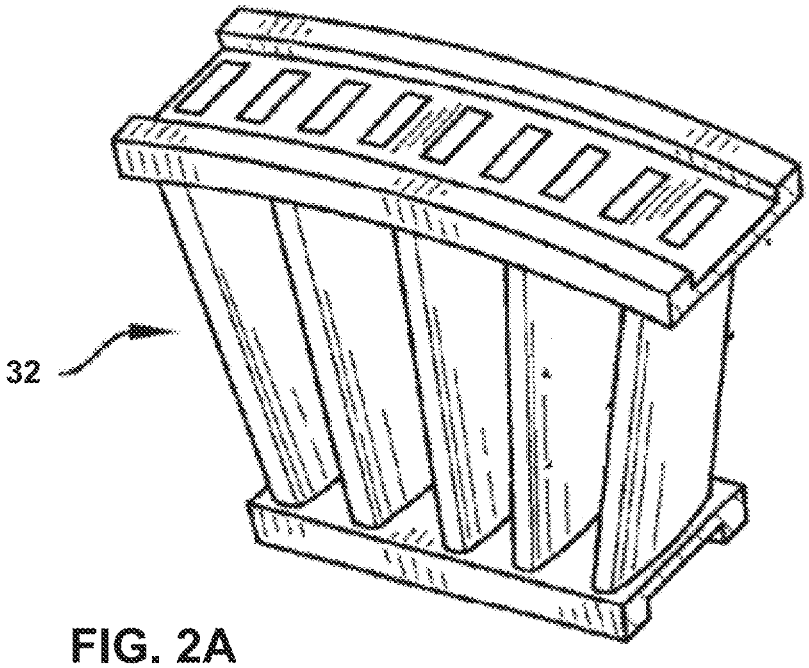
FIG. 2A is a diagram illustrating a perspective view of a vane segment showing a series of airfoils.
Figure 2B:
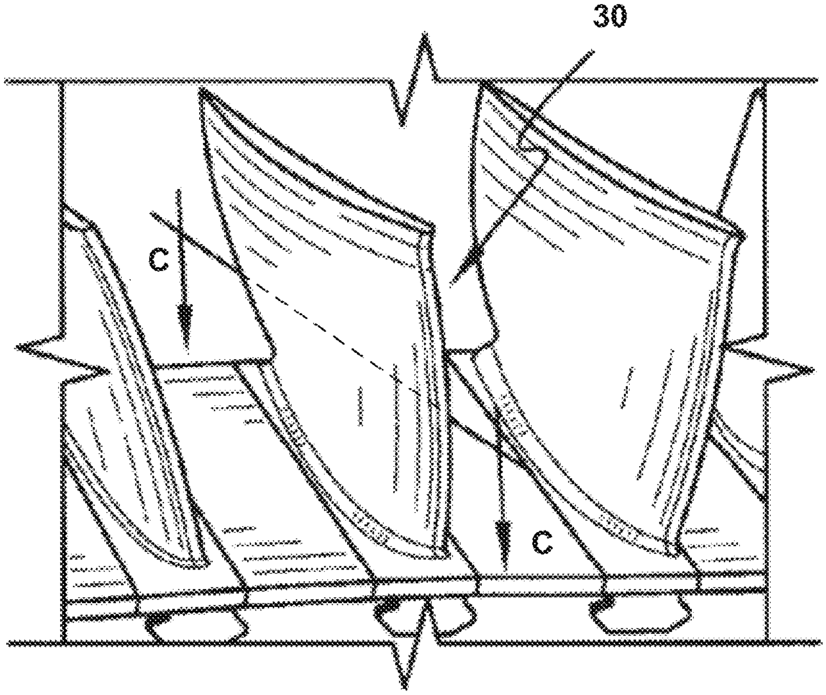
FIG. 2B is a diagram illustrating a perspective view of a series of compressor blades with each compressor including an airfoil.
Figure 3:
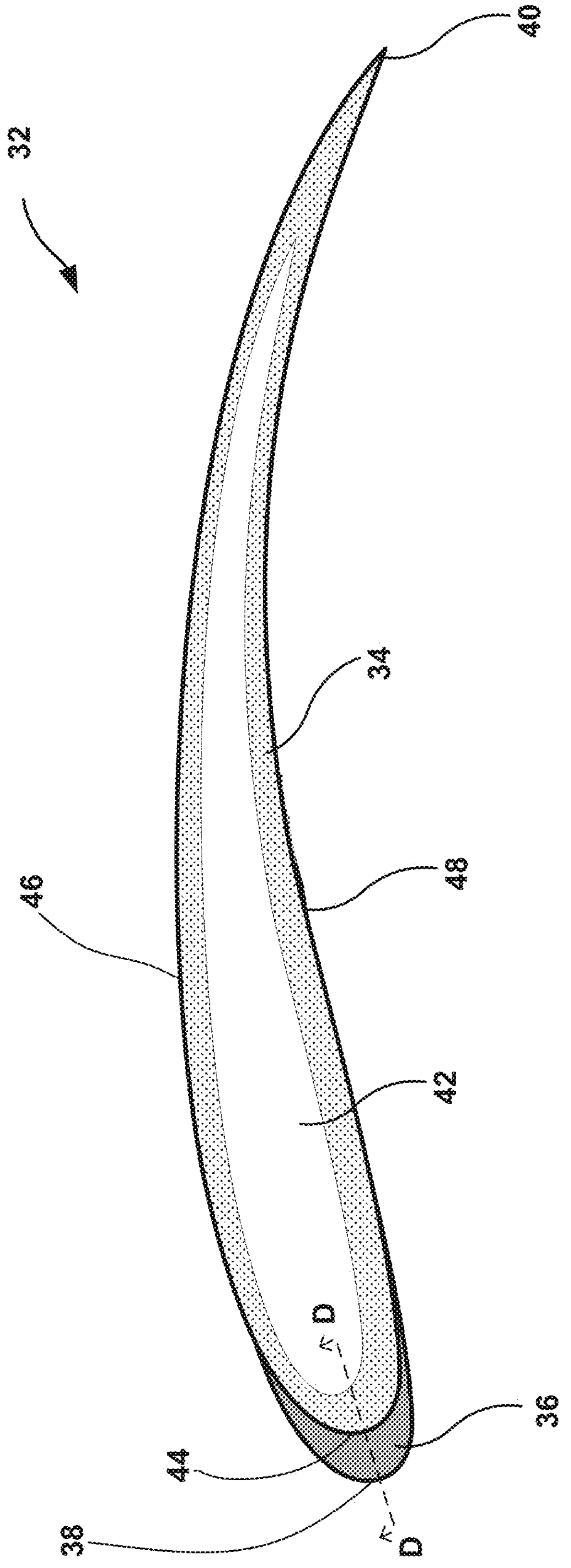
FIG. 3 is a conceptual diagram illustrating an example cross-sectional view of the compressor blade in FIG. 2B taken along lines C-C showing an airfoil having the protective coating of the present disclosure formed on the leading edge of the airfoil.

Engine 10 includes of variety of airfoils. For example, fan 12 includes a plurality of rotor blades, and both high-pressure compressor 14 and intermediate pressure compressor 13 includes a plurality of compressor blades and vanes. For case of illustration, only compressor blade 30 and compressor vane 32 are labelled in FIG. 1 although fan 12 and each stage of intermediate pressure compressor 13 and high-pressure compressor 14 may include multiple airfoils (e.g., in the form of a series of blades and/or vanes). Although not shown in the example of FIG. 1, example compressor airfoils may also include impellers for engines that include centrifugal compressor. FIG. 2A is a perspective view of a vane segment showing a series of airfoils including compressor vane 32. FIG. 2B is a perspective view of a series of compressor blades with airfoils including compressor blade 30. FIG. 3 is a conceptual schematic diagram illustrating compressor blade 30 along cross-section C-C shown in FIG. 2B.

As shown in FIG. 3, compressor blade 30 includes airfoil substrate 34. Airfoil substrate 34 may define hollow cavity 42. Airfoil substrate 34 may include a metal or metal alloy, organic matric composite (e.g., with carbon fiber), metal matrix composite, or the like. In examples in which substrate 34 includes a metal or metal alloy may include steel, nickel based alloys, or titanium.

Compressor blade 30 includes a leading edge 38 and a trailing edge 40. Suction surface 46 and pressure surface 48 each extend from leading edge 38 to trailing edge 40. In examples in which blade 30 is a rotor blade of a fan such as fan 12 or compressor such as compressor 13 or 14 in engine 10, a root portion may engage with a compressor disc to secure blade 30 to the compressor disc. As will be described further below, leading edge 38 of blade 30 is defining by protective coating 36 on the outer surface 44 of airfoil substrate 34, e.g., rather than outer surface 44 of airfoil substrate 34 being the outer surface of blade 30. Although not shown in FIG. 3, airfoil substrate 34 may include one or more holes that fluidically connect internal cavity 42 to the external environment across substrate 34. In other examples, rather than being a hollow blade, blade 30 may be a solid component.

Other examples of components of engine 10 that includes airfoils, although not labelled, include high-pressure turbine 16, intermediate-pressure turbine 17, and low-pressure turbine 18, which each includes a series of airfoils (e.g., in the form of turbine blades). As noted above, impeller(s) of a centrifugal type compressor may be an example airfoil of the present disclosure that may include a coating such as coating 36.

As described herein, the leading edge of one or more of the airfoils of engine 10 may be susceptible to erosion due to, e.g., particle impact during operation. For example, the leading edge 38 of compressor blade 30 along with the other blades and vanes in compressor 13 and/or high pressure compressor 14 may be subject to particle impact during operation, e.g., as a result of ingestion during takeoff and landing of an aircraft that employs engine 10.

In accordance with examples of the disclosure, one or more of the airfoils of engine 10 may include a protective coating defining the leading edge of the airfoil. For example, compressor blade 30 includes protective coating 36 on airfoil substrate 34 at leading edge 38 of blade 30. Protective coating 36 may resist the erosion at leading edge 38 of blade 32 from the impact of particles on leading edge 38 during operation of engine 10. For example, protective coating 36 may prevent particles ingested by engine from impacting the underlying surface 44 of airfoil substrate 34 such that protective coating 36 erodes over time during the operation of engine 10, at least initially, rather than surface 44 of substrate 34. In this manner, protective coating 36 may extend the operating life of blade 32, e.g., as compared to blade 32 being employed in engine 10 without protective coating 36 on substrate 34.

Figure 4:
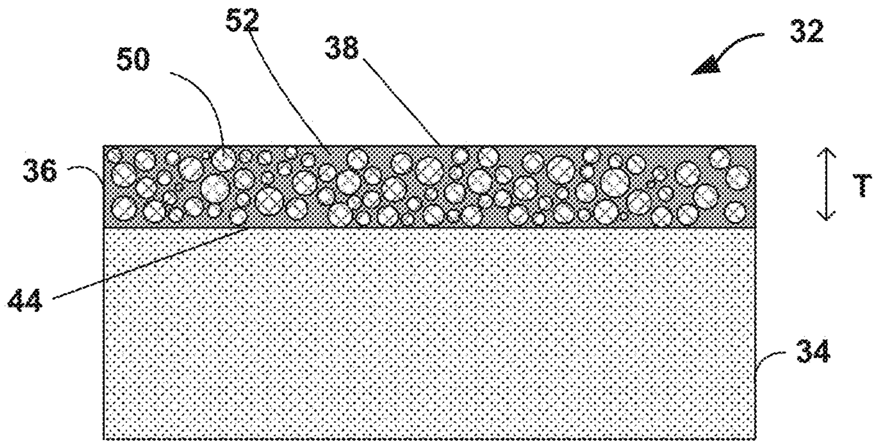
FIG. 4 is a conceptual diagram illustrating an example cross-sectional view of the compressor blade of FIG. 3 taken along line D-D.

Protective coating 36 includes carbide and metal. As shown in the cross-sectional view of FIG. 4, coating 36 includes a carbide 50 and a metal 52, e.g., as carbide phase 50 in a metal matrix phase 52. Carbide 50 may be any suitable carbide material or a combination of multiple different types of carbide materials. In some examples, carbide 50 may be relatively hard such that coating 36 provides erosion and/or other protection for leading edge 38 of compressor blade 32, e.g., by protecting against particle impacts during takeoff and landing of an aircraft. In some examples, carbide 50 may include at least one of tungsten carbide (WC), chromium carbide (CrC), titanium carbide (TiC), or other carbides that provide coating 36 with a desirable degree of hardness.

Metal 52 of coating 36 may be any suitable metal or metal alloy. Metal 52 may be selected so that coating 36 is relatively ductile in addition to the hardness provided by carbide 50. For example, the metal composition for the metal matrix phase 52 may be selected to provide for a relatively ductile matrix around the carbide phase 50. Example metal compositions for metal 52 of coating 36 may include one or more of cobalt, cobalt chromium (CoCr), nickel chromium (NiCr), CoNiCrAlY, and/or the like. The metal composition may also be selected to provide corrosion protection as well to all or portions of blade 32, such as substrate 34 of blade 32. The metal composition may be selected based on ductility and environmental engine factors expected for the application. The fracture toughness provided to coating 36 may be a measure of such parameters, and may be quantified by erosion rates.

The ductility of coating 36 provided by metal 52 may prevent coating 36 from "chipping" or fracturing all the way through the thickness T of coating 36 as a result of one or more particle impacts on the outer surface of coating 36 at or near leading edge 38. If coating 36 fractures/chips in such a manner, the underlying surface 44 of substrate 34 may be undesirably exposed during the operation of engine 10. Conversely, protective coating 36 may erode more gracefully in a sense that protective coating 36 erodes more gradually rather than abrupt chipping. The "graceful" erosion of protective coating 36 may result from the relatively ductile metal matrix 52 that is less susceptible to cracking but that instead may be remove slowly through a process of microscopic chipping (e.g., chips out of the coating that are much less than the thickness T of the coating 36).

In addition to the type of metal, the relative amount of metal 52 in coating 36 may influence the overall ductility of coating 36. Likewise, the relative amount of carbide 50 in coating 36 may influence the overall hardness of coating 36. Thus, the amount of carbide 50 and metal 52 may be selected to tailor the hardness and ductility of coating 36 (as well as other properties of coating 36). In some examples, coating 36 includes at least about 17 weight percent (wt %) metal 52 or at least about 25 wt % metal, such as about 17 wt % to about 40 wt % or about 25 wt % to about 40 wt % metal 52. In some examples, coating 36 includes at least about 60 weight percent carbide 50, such as about 60 wt % to about 75 wt % carbide 50, e.g., with a remainder being metal 52.

In addition to the amount of metal 52 and the amount of carbide 50 in coating 36, the size of the respective "islands" of carbide 50 with metal matrix 52 of coating 36 may influence the performance of coating 36, e.g., with respect to protecting airfoil 32 leading edge 38 from erosion. In some examples, the respective islands of carbide 50 in coating 36 may be relatively small, e.g., by depositing a feedstock powder that includes relatively small carbide particles. In some examples, each "island" of carbide 50 may be an individual carbide particle. In some examples, the individual "islands" of carbide 50 may have an average particle size of about 1 micron or less, such as sub-micron particles having an average particle size of less than 1 micron, e.g., less than one micron but greater than about 0.1 micron, less than 0.75 microns, about 0.5 microns, or nano-particles having an average particle size of about 1 nanometer to about 1000 nanometers, about 1 nanometer to about 500 nanometers, or about 500 nanometers to about 1000 nanometers. The lower limit for particle size may be dictated by the type of application process used to form coating 36.

As noted above, by employing relatively small carbide particles (e.g., less than about 1 micron), the resulting protective coating 36 may be more ductile because of a relatively high amount of particle boundaries resulting from the use of such relatively small carbide particles, e.g., as compared to the use carbide particles having an average size of greater than 1 micron. The ductility may provide for better energy absorption by the coating upon high velocity impacts with foreign particles, e.g., due to the deformation of the coating. In general, the use of sub microns particles help with the wear and increased loading in the coating. For example, the overall toughness of the coating is improved by using sub-microns particles, which improves the wear characteristics, and also improved hardness.

In some examples, the amount of metal 52, the amount of carbide 50, and/or size of the respective island of carbide 50 within metal 52 may be selected such that coating 36 exhibits a hardness of at least about 100 Vickers hardness number (HV), at least about 500 HV, or at least about 1000 HV, such as about 100 HV to about 1000 HV, 500 HV to 1000 HV, or 100 HV to about 500 HV.

In some examples, the amount of metal 52, the amount of carbide 50, and/or size of the respective island of carbide 50 within metal 52 may be selected such that coating 36 exhibits a more uniform or "graceful" erosion over time with the operation of engine 10, e.g., as compared to a protective coating that is harder than coating 36. For example, the amount of metal 52, the amount of carbide 50, and/or size of the respective island of carbide 50 within metal 52 may be selected such that coating 36 erodes by microchipping (e.g., with "chips" or individual pieces of coating 36 resulting from the fracture that do not extend through the entire thickness T of coating 36) due to impact from particles during operation of engine 10 rather than fracturing and removing pieces of coating 36 that extend all the way through the thickness T of coating 36 to expose surface 44 of airfoil substrate 34.

As one example, in the case of an example coating 36 including tungsten carbide (WC) for carbide 50 and cobalt for metal 52, coating may include at least about 17 weight percent (wt %) cobalt such as about 17 wt % to about 25 wt %, about 17 wt % to about 40 wt %, or 25 wt % to about 40 wt % cobalt, or about 40 wt % cobalt, e.g., with the remainder being WC. The amount of WC in such a coating may be at least about 60 wt %, such as about 60 wt % to about 75 wt %.

Figure 5:
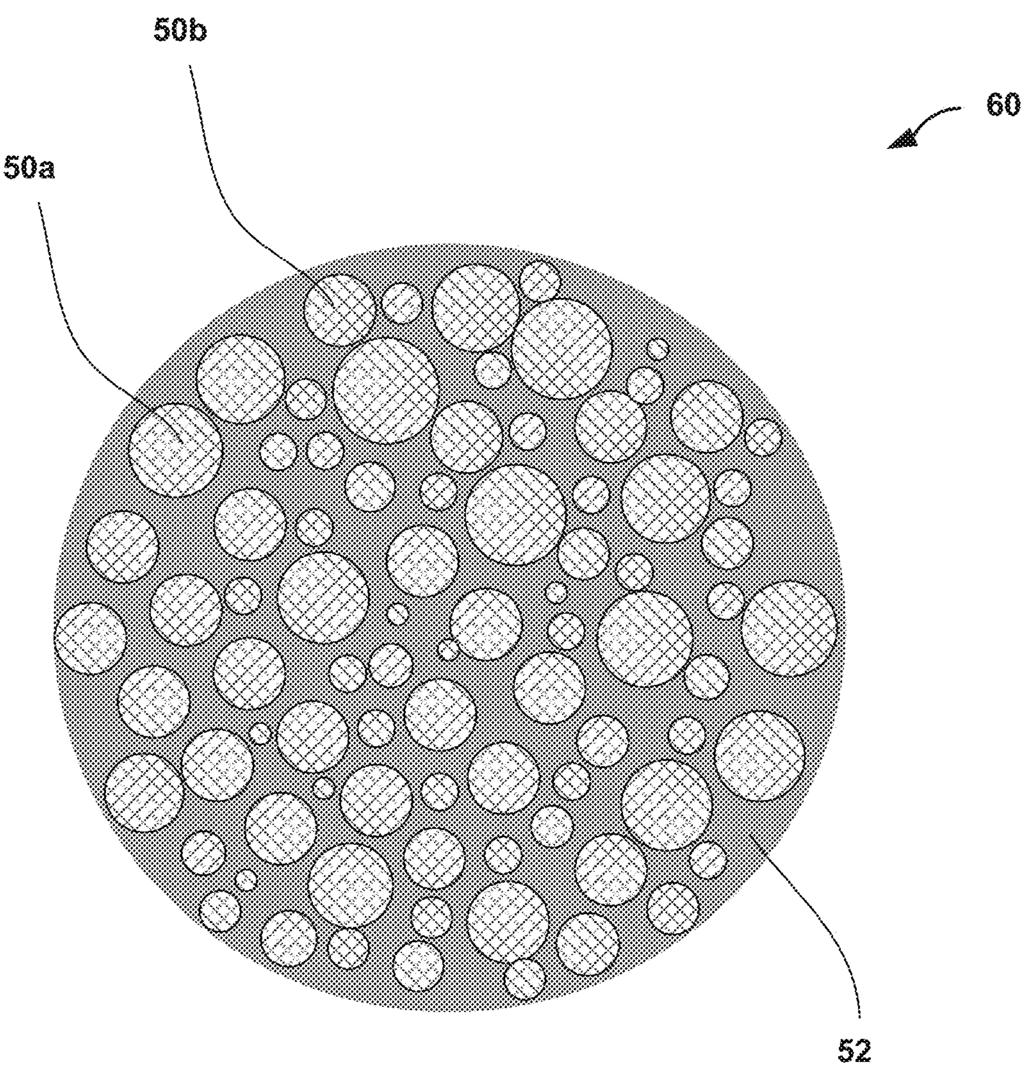
FIG. 5 is a conceptual diagram illustrating an example agglomerate including carbide particles in a metal matrix.

Coating 36 may be formed using any suitable techniques. In some examples, a powder including carbide particles that form carbide 50 and a metal or alloy that forms metal matrix 52 may be deposited on surface 44 of airfoil substrate 34 using suitable deposition techniques. In some examples, a thermal spray process may be employed, such as plasma spray, suspension plasma spray, low pressure plasma spray, cold spray, flame Spray, or the like. In some examples, coating 36 may be formed by depositing a feedstock powder by a high velocity oxygen fuel (HVOF) or high velocity air fuel (HVAF) process. The feedstock powder may include both the metal and carbide particles either separately or as agglomerates (e.g., sintered agglomerates) including carbide particles in a metal matrix. FIG. 5 is a conceptual diagram illustrating an individual agglomeration 60 that may be part of the deposited powder feedstock for forming coating 36. As shown, agglomeration 60 includes individual particles of carbide such as particles 50*a* and 50*b* in a metal matrix 52. Agglomeration 60 may be formed by agglomerating carbide particles with metal powder using a binder. The binder may then be removed from the agglomeration by a sintering process. The result may be agglomeration 60.

As described above, coating 36 may have relatively small "islands" of carbide phase 50 within metal matrix 52. This may be accomplished by using relatively small carbide particles, such as particles with an average particle size that is sub-micron. In the example of FIG. 5, the carbide particles in agglomeration 60 (such as particles 50*a* and 50*b*) may have an average size of about 500 nanometers to about 1000 nanometers, or the other average particle sizes described above, e.g., with regard to FIG. 4. Agglomeration 60 may have an average particle size of about 45 micrometers or less.

Protective coating 36 may have any suitable thickness, e.g., as measured at leading edge 38 of compressor blade 30. In some examples, protective coating 36 may have a thickness T (labeled in FIG. 4) of at least about 10 micrometers, such as about 15 to about 75 micrometers, about 15 micrometers to about 25 micrometers, about 75 micrometers to about 80 micrometers or about 15 micrometers to about 80 micrometers. In some examples, protective coating 36 may have a thickness T of about 80 microns or less. In the illustration of FIG. 3, the thickness of protective coating 36 is non-uniform. The non-uniform thickness may provide for a gradual transition to the exposed surfaces of substrate 34 moving away from leading edge 38, e.g., rather than defining an abrupt step change from coating 36 to the exposed surface of substrate 34. In some examples, the thickness of coating 36 may be greatest at leading edge 38 and/or the position on blade 30 that is directly orthogonal to the pathway of ingested particles (corresponding to the area of most direct impact of particles). The thickness of coating 36 may then taper moving in either direction toward trailing edge 40.

While FIG. 3 illustrates protective coating 36 as only being applied at and near leading edge 38 of blade 32, in other examples, protective coating 30 may also be present further along suction side 46 and/or pressure side 48 toward trailing edge 40. In some examples, the entire outer surface of substrate 34 may be covered by protective coating 36. In some examples, protective coating 30 may extend to or near the midway point between leading edge 38 and trailing edge 40 on one or both of suction side 46 and pressure side 48, or even beyond the respective midpoints on each side.

EXAMPLES

Figure 6:
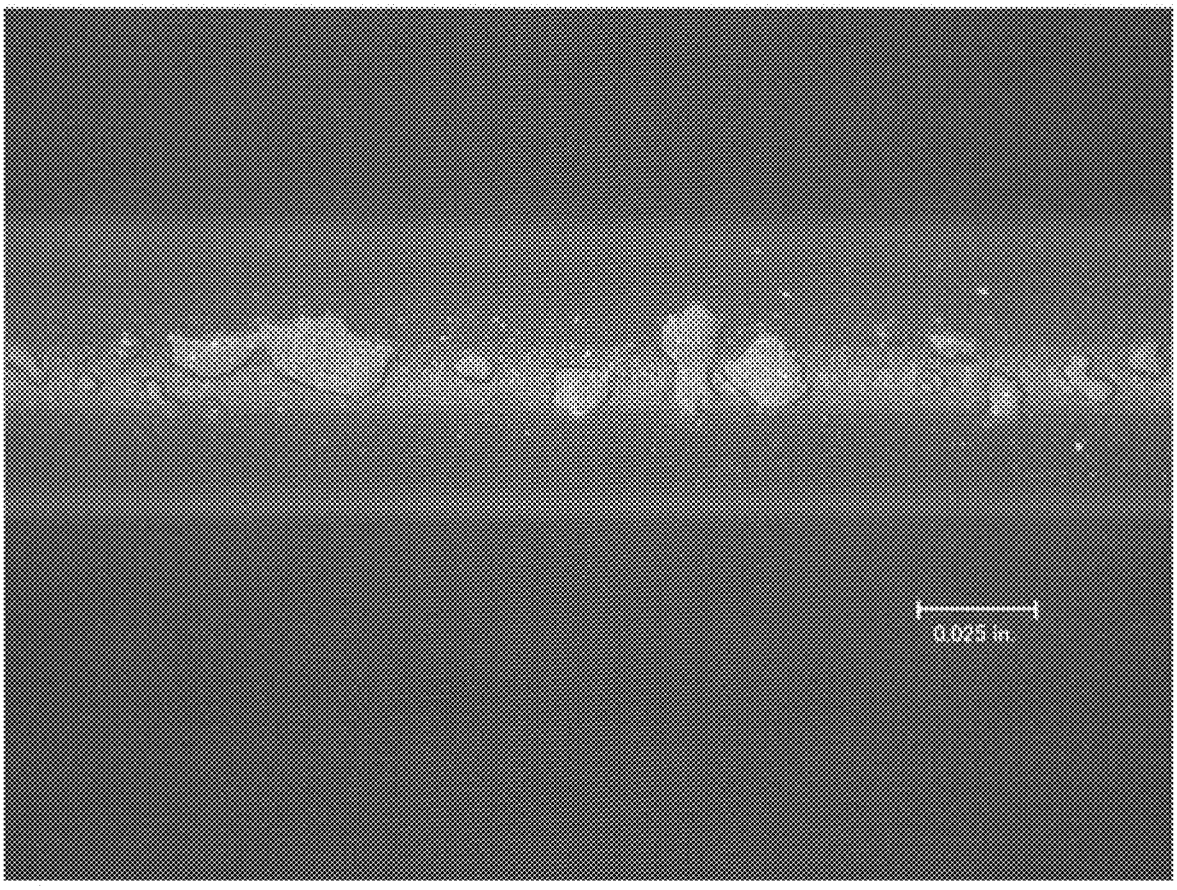
FIG. 6 is a photograph showing the leading edge of an example airfoil with a TiAlN coating applied to a titanium substrate after the TiAlN coating has been eroded.

A variety of investigations were carried out to evaluate aspects of the present disclosure. In a first instance, the leading edge of a titanium airfoil substrate was coated with a TiAlN coating of about 15 microns to about 20 microns thickness. After the coating was applied, the coating was impacted with particle to simulate erosion of the coating under operation conditions of a gas turbine engine. The particle impact energy was sufficient to compromise the coating such that fracture was observed with subsequent chipping. FIG. 6 is a photograph of the TiAlN coating after being eroded. As shown, it was found that the coating particle impacts eroded the coating by removing relatively large chips which extended through the thickness of the coating, which exposed the surface of the underlying titanium substrate. The chips in the leading edge of the coated specimen show the localized coating failure and subsequent erosion of the underlying titanium.

Figure 7A:
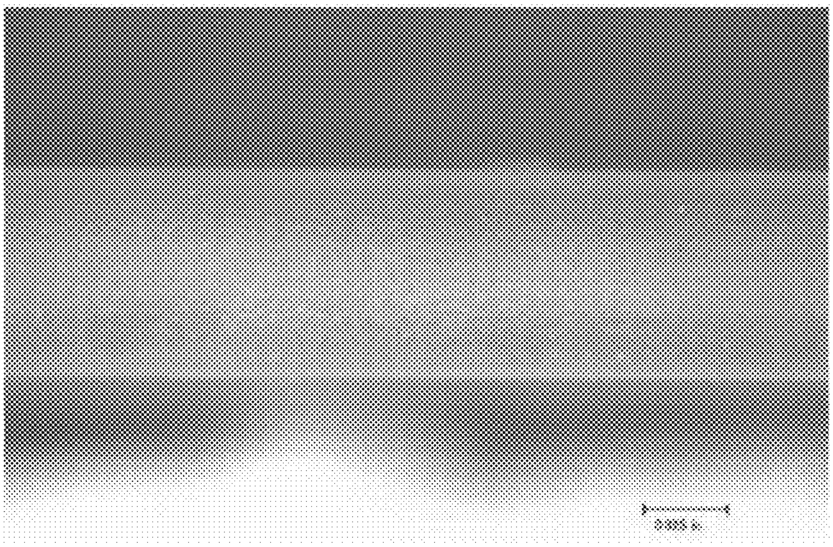
FIG. 7A-7C are photographs showing the progression of a protective coating according to one example of the disclosure being eroded on the leading edge of an airfoil.
Figure 7B:
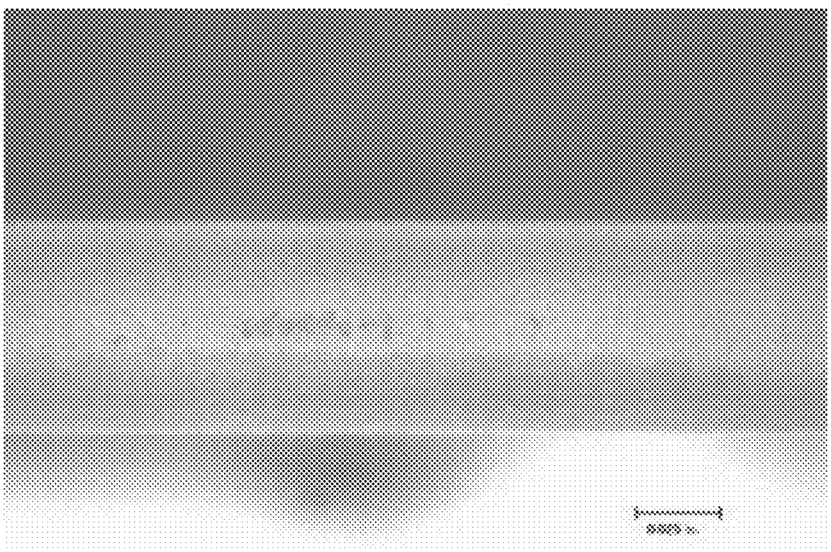
Figure 7C:
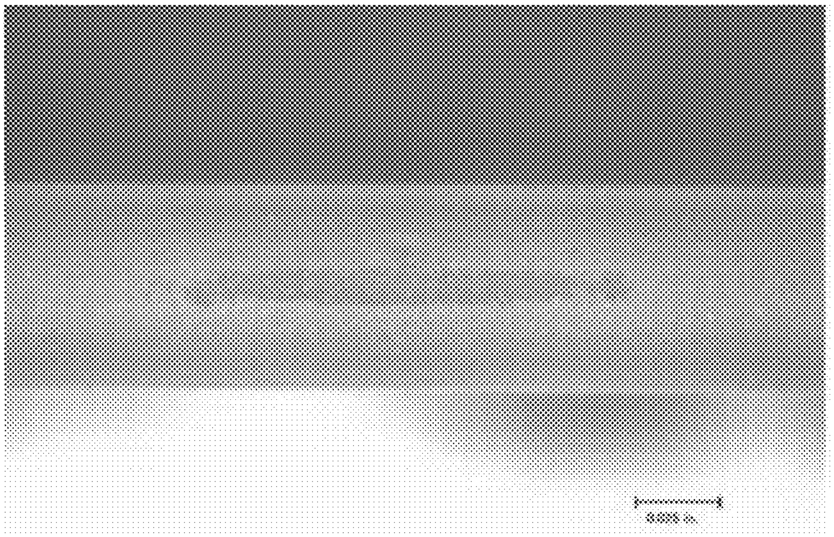

For comparison with the TiAlN coating, another specimen was formed with a more ductile coating (including carbide particles in a metal matrix according to an example of the present disclosure) being applied on a titanium airfoil substrate at the leading edge of the airfoil. FIGS. 7A-7C are series of photographs showing the progression of the more ductile protective coating being eroded by the particle impacts, with FIG. 7A showing the coating with no erosion, FIG. 7B showing an initial amount of coating erosion, and FIG. 7C showing even more erosion of the protective coating. The coating had carbide in the form of about 4 wt % chromium carbide and about 10 wt % WC, with the remainder being the metal matrix in the form of nickel chromium, and was formed on a titanium substrate with a thickness of about 50 to about 75 micrometers. As shown, it was found that the coating eroded by microchipping relatively uniformly across the leading edge. While FIG. 7C shows that the erosion of the coating did break through to the substrate, the erosion was in a graceful manner, e.g., being relatively uniform.

Figure 8:
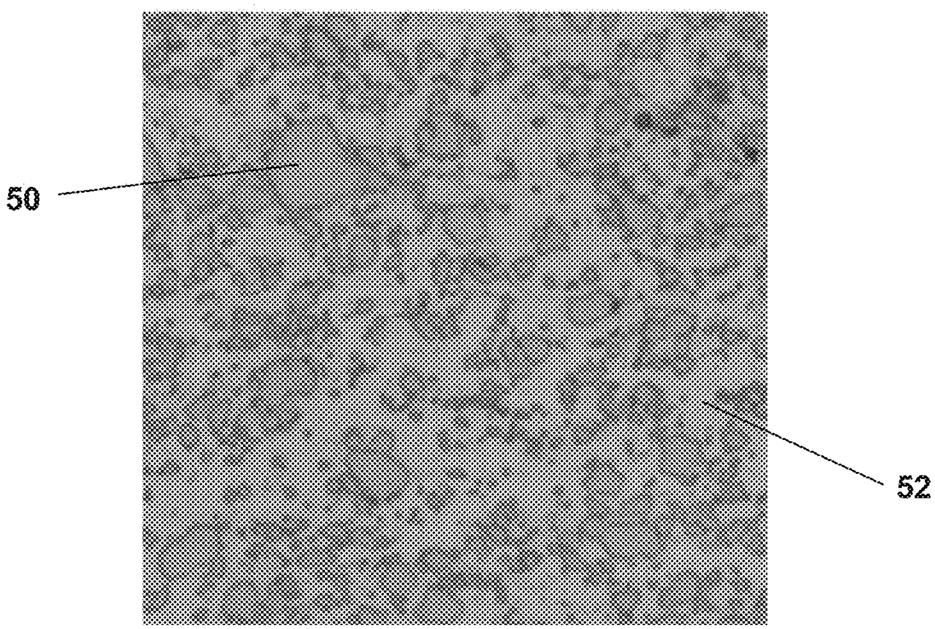
FIG. 8 is a SEM image of an example protective coating including carbides in a metal matrix.

FIG. 8 is an optical image of an example protective coating 36 including carbides 50 in a metal matrix 52. Carbide 50 was WC and metal matrix 52 was cobalt, with about 17 wt % being cobalt and the remainder being WC. Coating 36 was formed by HVOF. It was determined that coating 36 exhibited a ductility and hardness that would make it desirable to protect the leading edge of an airfoil such as a compressor blade in a gas turbine engine from erosion in the manner described herein. As FIG. 8 shows, the carbide particles 50 where suspended in metal matrix 52 for the protective coating 36.

Various examples have been described. These and other examples are within the scope of the following clauses and claims.

Clause 1. A method of forming an article for a gas turbine engine, the method comprising depositing a powder to form a protective coating on a leading edge of an airfoil substrate, wherein the powder includes carbide particles in a metal matrix, wherein the carbide particles have an average particle size of about 1 microns or less, and wherein the protective coating includes the carbide particles in the metal matrix.

Clause 2. The method of clause 1, wherein the protective coating is configured to erode at a slower rate than the leading edge of the airfoil substrate without the protective coating.

Clause 3. The method of clauses 1 or 2, wherein the protective coating includes at least about 25 weight percent of the metal matrix.

Clause 4. The method of clause 3, wherein a remainder of the protective coating is the carbide particles.

Clause 5. The method of any one of clauses 1-4, wherein the metal matrix of the protective coating is configured to increase a ductility of the protective coating as compared another coating including the carbide particle with a lesser amount of the metal matrix.

Clause 6. The method of any one of clauses 1-5, wherein the carbide particles includes at least one of tungsten carbide (WC), chromium carbide (CrC), or titanium carbide (TiC), and the metal matrix includes at least one of cobalt, cobalt chromium, nickel chromium, or CoNiCrAlY.

Clause 7. The method of any one of clauses 1-6, wherein the carbide particles includes tungsten carbide (WC) and the metal matrix includes cobalt, and wherein the protective coating includes about 25 weight % to about 40 weight % of the cobalt.

Clause 8. The method of any one of clauses 1-7, wherein the powder includes a plurality of agglomerates, wherein respective agglomerates of the plurality of agglomerates includes the carbide particles in the metal matrix.

Clause 9. The method of any one of clauses 1-8, wherein the protective coating has a thickness of at least about 10 micrometers.

Clause 10. The method of any one of clauses 1-9, wherein depositing the powder to form the protective coating includes depositing the powder on the leading edge of the airfoil substrate via a high velocity oxygen fuel or high velocity air fuel process.

Clause 11. The method of any one of clauses 1-10, wherein the average size of the carbide particles is less than 1 micron.

Clause 12. The method of any one of clauses 1-10, wherein the average size of the carbide particles is from about 500 nanometer to about 1000 nanometers.

Clause 13. An article comprising: an airfoil body; and a protective coating on a leading edge of the airfoil body, wherein the protective coating includes carbide particles in a metal matrix, wherein the carbide particles in the metal matrix has an average particle size of about 1 microns or less.

Clause 14. The article of clause 13, wherein the protective coating is configured to erode at a slower rate than the leading edge of the airfoil substrate without the protective coating.

Clause 15. The article of clauses 13 or 14, wherein the protective coating includes at least about 25 weight percent of the metal matrix.

Clause 16. The article of clause 15, wherein a remainder of the protective coating is the carbide particles.

Clause 17. The article of any one of clauses 13-16, wherein the metal matrix of the protective coating is configured to increase a ductility of the protective coating as compared another coating including the carbide particle with a lesser amount of the metal matrix.

Clause 18. The article of any one of clauses 13-17, wherein the carbide particles includes at least one of tungsten carbide (WC), chromium carbide (CrC), or titanium carbide (TiC), and the metal matrix includes at least one of cobalt, cobalt chromium, nickel chromium, or CoNiCrAlY.

Clause 19. The article of any one of clauses 13-18, wherein the carbide particles includes tungsten carbide (WC) and the metal matrix includes cobalt, and wherein the protective coating includes about 25 weight % to about 40 weight % of the cobalt.

Clause 20. The article of any one of clauses 13-19, wherein the protective coating has a thickness of at least about 10 micrometers.

Clause 21. The article of any one of clauses 13-20, wherein the average size of the carbide particles is less than 1 micron.

Clause 22. The article of any one of clauses 13-20, wherein the average size of the carbide particles is from about 500 nanometer to about 1000 nanometers.

Clause 23. A system comprising a gas turbine engine, the gas turbine engine including an airfoil according to any one of clauses 13-22.

Clause 24. The system of clause 23, wherein the gas turbine engine includes a compressor section, and wherein the airfoil comprises a compressor blade.

Clause 25. The system of clauses 23 or 24, wherein the gas turbine engine comprises a turboshaft engine or turboprop engine.

What is claimed is:

1. A method of forming an article for a gas turbine engine, the method comprising depositing a powder to form a protective coating on a leading edge of an airfoil substrate, wherein the powder includes carbide particles in a metal matrix, wherein the carbide particles have an average particle size of 1 microns or less, wherein the protective coating includes the carbide particles in the metal matrix, and wherein the protective coating has a non-uniform thickness over a surface of the airfoil substrate.

2. The method of claim 1, wherein the protective coating covers the leading edge of the airfoil substrate, and wherein the protective coating is configured to erode at a slower rate than the leading edge of the airfoil substrate without the protective coating.

3. The method of claim 1, wherein the protective coating includes at least 25 weight percent of the metal matrix.

4. The method of claim 3, wherein a remainder of the protective coating is the carbide particles.

5. The method of claim 1, wherein the metal matrix of the protective coating is configured to increase a ductility of the protective coating as compared another coating including the carbide particle with a lesser amount of the metal matrix.

6. The method of claim 1, wherein the carbide particles includes at least one of tungsten carbide (WC), chromium carbide (CrC), or titanium carbide (TiC), and the metal matrix includes at least one of cobalt, cobalt chromium, nickel chromium, or CoNiCrAlY.

7. The method of claim 1, wherein the carbide particles includes tungsten carbide (WC) and the metal matrix includes cobalt, and wherein the protective coating includes 25 weight % to 40 weight % of the cobalt.

8. The method of claim 1, wherein the powder includes a plurality of agglomerates, wherein respective agglomerates of the plurality of agglomerates includes the carbide particles in the metal matrix.

9. The method of claim 1, wherein the protective coating has a maximum thickness of at least 10 micrometers.

10. The method of claim 1, wherein depositing the powder to form the protective coating includes depositing the powder on the leading edge of the airfoil substrate via a high velocity oxygen fuel or high velocity air fuel process.

11. The method of claim 1, wherein the average size of the carbide particles is less than 1 micron.

12. The method of claim 1, wherein the average size of the carbide particles is from 500 nanometer to 1000 nanometers.

13. The method of claim 1, wherein depositing the powder to form the protective coating on the leading edge of an airfoil substrate comprises depositing, via thermal spraying, the powder to form the protective coating on the leading edge of the airfoil substrate.

14. An article comprising:

an airfoil body; and a protective coating on a leading edge of the airfoil body, wherein the protective coating includes carbide particles in a metal matrix, wherein the carbide particles in the metal matrix has an average particle size of 1 microns or less, and wherein the protective coating has a non-uniform thickness over a surface of the airfoil body.

15. The article of claim 14, wherein the protective coating is configured to erode at a slower rate than the leading edge of the airfoil body without the protective coating.

16. The article of claim 14, wherein the protective coating includes at least 25 weight percent of the metal matrix.

17. The article of claim 16, wherein a remainder of the protective coating is the carbide particles.

18. The article of claim 14, wherein the carbide particles includes tungsten carbide (WC) and the metal matrix includes cobalt, and wherein the protective coating includes 25 weight % to 40 weight % of the cobalt.

19. The article of claim 14, wherein the protective coating has a maximum thickness of at least 10 micrometers.

20. The article of claim 14, wherein a composition of the protective coating is different than a composition of the airfoil substrate.

* * * * *